United States Patent [19]
Webster

[11] Patent Number: 5,095,510
[45] Date of Patent: Mar. 10, 1992

[54] DEVICE AND METHOD FOR VERIFYING PERSONAL HANDWRITING

[75] Inventor: John R. Webster, Derby, England

[73] Assignee: Rolls-Royce plc, London, England

[21] Appl. No.: 637,704

[22] Filed: Jan. 7, 1991

[30] Foreign Application Priority Data

Feb. 16, 1990 [GB] United Kingdom ............... 9003572
Jun. 27, 1990 [GB] United Kingdom ............... 9014303

[51] Int. Cl.⁵ ............................................. G06K 9/00
[52] U.S. Cl. ......................................... 382/3; 382/13; 382/30
[58] Field of Search ................ 382/3, 34, 13, 30; 178/18, 19, 20

[56] References Cited

U.S. PATENT DOCUMENTS

| | | | |
|---|---|---|---|
| 4,128,829 | 12/1978 | Herbst et al. | 382/3 |
| 4,553,259 | 11/1985 | Chainer et al. | 382/3 |
| 4,562,592 | 12/1985 | Chainer et al. | 382/3 |
| 4,724,542 | 2/1988 | Williford | 382/3 |
| 4,789,934 | 12/1988 | Gundersen et al. | 382/3 |

FOREIGN PATENT DOCUMENTS

| | | |
|---|---|---|
| 1227643 | 6/1969 | United Kingdom . |
| 1400374 | 3/1973 | United Kingdom . |
| 1480066 | 7/1973 | United Kingdom . |
| 2159998 | 12/1985 | United Kingdom . |

OTHER PUBLICATIONS

Sakoe et al., "Dynamic Programming Algorithm Optimization for Spoken Word Recognition", IEEE Transactions On Acoustics, Speech, and Signal Processing, vol. ASSP-26, No. 1, Feb., 1978, pp. 43-49.

Primary Examiner—Joseph Mancuso
Attorney, Agent, or Firm—Cushman, Darby & Cushman

[57] ABSTRACT

The stress wave activity produced in a surface by a writing instrument during the generation of a given piece of handwriting is detected by a transducer and is electrically processed. The stress wave activity is compared with a stress wave activity, produced during at least one previous generation of the given piece of handwriting, held in a store, by a processing unit in order to determine whether the detected and stored handwriting pieces have a common author. If the detected and stored handwriting pieces are determined to have a common author a weighted average of the stored stress wave activity and the detected stress wave activity is produced. The weighted average includes a weighted average of the amplitudes and a weighted average of times of events. This weighted average stress wave activity then replaces the stored stress wave activity in the store. This allows natural variations in the way an individual writes a given piece of handwriting to be accommodated without false indications of inauthenticity.

15 Claims, 2 Drawing Sheets

DEVICE AND METHOD FOR VERIFYING PERSONAL HANDWRITING

BACKGROUND OF THE INVENTION

1. Field of the Invention

The present invention relates to an apparatus and method for verifying personal handwriting.

2. Description of the Prior Art

It is known from British Patent No. GB2159998B to detect and store a time varying characteristic, e.g. the stress wave activity produced in a body by a writing instrument during the generation of a given piece of handwriting. The time varying characteristic, e.g. the stress wave activity, produced by a subsequent generation of the given piece of handwriting is then compared with that produced by the initial piece of handwriting in order to determine whether the initial and subsequent handwriting pieces have a common author.

A problem associated with this procedure is that the general characteristic of the way an individual writes a given piece of handwriting, e.g. a signature, naturally varies over longer periods of time. Also there is considerable natural short term variability in the way an individual writes a given piece of handwriting, e.g. a signature.

These variations in the way an individual writes a given piece of handwriting may result in a subsequent authentic piece of handwriting being determined to be not from the same author as the initial piece of handwriting.

SUMMARY OF THE INVENTION

The present invention seeks to provide a novel apparatus and method for verifying personal handwriting which overcomes the above problems.

Accordingly the present invention provides a device for verifying personal handwriting comprising means for detecting a time varying characteristic produced by the motion of a writing instrument on a surface of a body during the generation of a given piece of handwriting, means for comparing said detected time varying characteristic with a stored time varying characteristic produced by the motion of the same or a different writing instrument on the same or a different surface of the same or a different body during the generation of at least one previous like piece of handwriting to provide an indication of whether the generation of said handwriting pieces produce substantially common time varying characteristics and thus whether the pieces have been generated by a common author, the means for comparing said detected time varying characteristic with said stored time varying characteristic is arranged to compare each point or portion of said detected time varying characteristic with said stored time varying characteristic, means is arranged to produce a weighted average of said stored time varying characteristic and said detected time varying characteristic produced during the generation of a piece of handwriting by a common author, means is arranged to replace said stored time varying characteristic with the weighted average of said stored time varying characteristic and said detected time varying characteristic produced during the generation of a piece of handwriting by a common author.

The means for comparing the detected time varying characteristic with the stored time varying characteristic may be arranged to distort each point or portion of said detected time varying characteristic in time to obtain a best match with the stored time varying characteristic and stores each of the values of time distortion required to obtain the best match.

The means for producing a weighted average of the detected time varying characteristic and the stored time varying characteristic may be arranged to distort each point or portion of the detected time varying characteristic in time by the corresponding one of the values stored by the comparing means to obtain the best match with the stored time varying characteristic, and is arranged to produce weighted average magnitudes of said time varying characteristic between the stored time varying characteristic and the time distorted detected time varying characteristic and is arranged to produce a weighted average of time of events by displacing the weighted average magnitudes of said time varying characteristic in time towards the detected time varying characteristic.

The means for comparing the detected time varying characteristic with the stored time varying characteristic may be arranged to detect relatively low or zero magnitudes of the time varying characteristic and is arranged to reduce the errors associated with the stored values of time distortion required to obtain the best match with the stored time varying characteristic.

The means for detecting the time varying characteristic may be a capacitor defined between the writing instrument and the surface of the body, the time varying characteristic is capacitance.

The means for detecting the time varying characteristic may be a load cell for detecting load or pressure produced by the motion of the writing instrument on the surface of the body.

Preferably the means for detecting the time varying characteristic is an acoustic emission transducer for detecting the stress wave activity produced by the motion of the writing instrument on the surface of the body.

The means for detecting the stress wave activity may comprise a resonant acoustic emission transducer.

A means for processing the detected stress wave activity may include an enveloping means.

The present invention also provides a method of verifying personal handwriting comprising detecting a time varying characteristic produced by the motion of a writing instrument on a surface of a body during the generation of a given piece of handwriting, comparing the detected time varying characteristic with a stored time varying characteristic produced by the motion of the same or a different writing instrument on the same or a different surface of the same or a different body during the generation of at least one previous like piece of handwriting to provide an indication of whether the generation of said handwriting pieces produce substantially common time varying characteristic and thus whether the pieces have been generated by a common author, comparing each point or portion of the detected time varying characteristic with the stored time varying characteristic, producing a weighted average of the stored time varying characteristic and the detected time varying characteristic produced during the generation of a piece of handwriting by a common author, replacing the stored time varying characteristic with the weighted average of the stored time varying characteristic and the detected time varying characteristic produced during the generation of a piece of handwriting by a common author.

Each part or portion of the detected time varying characteristic may be distorted in time to obtain a best match with the stored time varying characteristic, each of the values of time distortion required to obtain the best match is stored.

Each part or portion of the detected time varying characteristic may be distorted in time by the corresponding one of the stored values to obtain the best match with the stored time varying characteristic, producing weighted average magnitudes of said time varying characteristic between the stored time varying characteristic and the time distorted detected time varying characteristic and producing a weighted average of time of events by displaying the weighted average magnitudes of said time varying characteristic in time towards the detected time varying characteristic.

The time varying characteristic may be capacitance, load, pressure or stress wave activity.

BRIEF DESCRIPTION OF THE DRAWINGS

The present invention will be more fully described by way of example, with reference to the accompanying drawings, in which.

DESCRIPTION OF THE PRESENTLY PREFERRED EXEMPLARY EMBODIMENT

Figure 1:
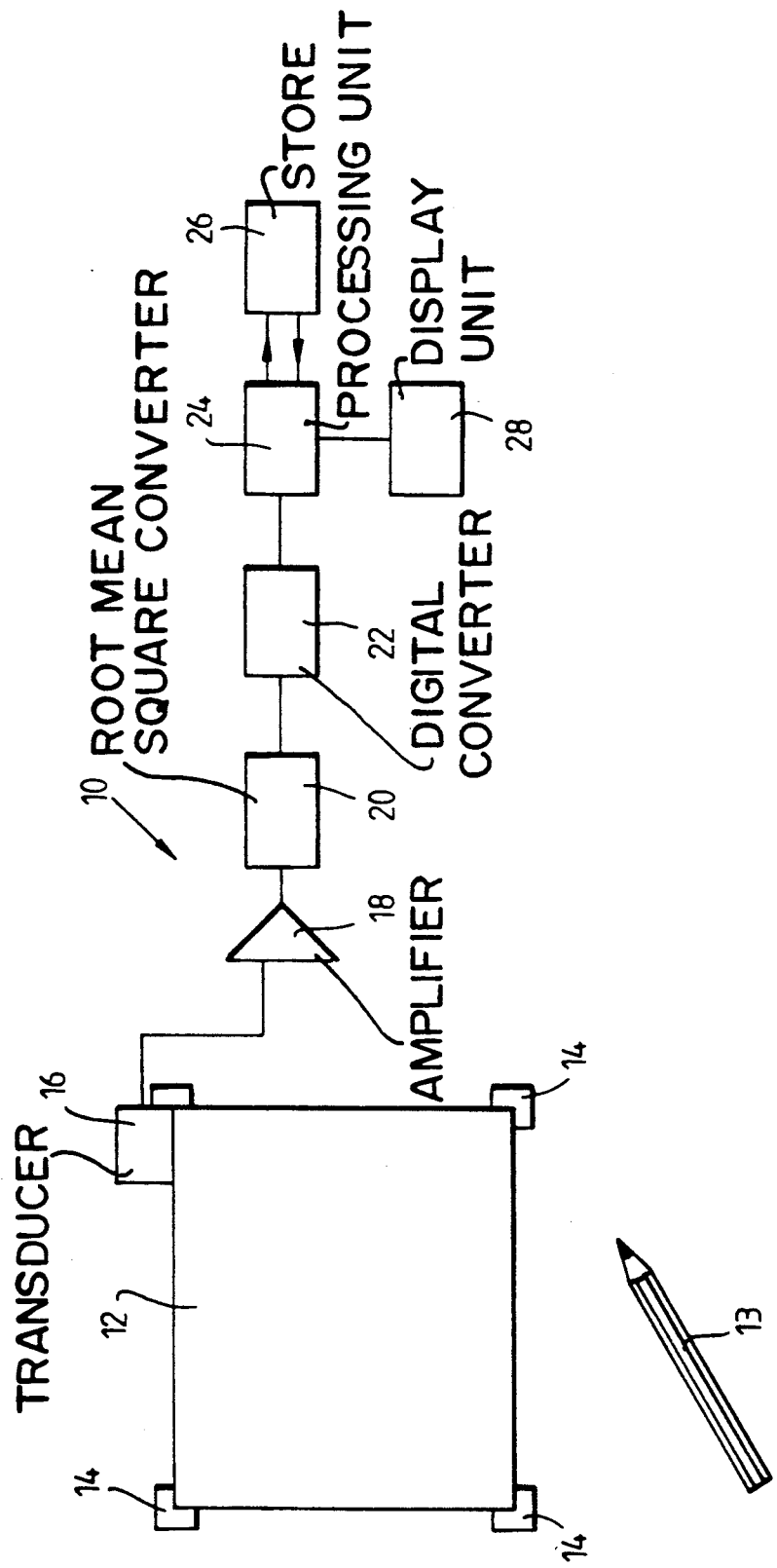
FIG. 1 is a block diagram of a device in accordance with the present invention.

A device for verifying personal handwriting is shown in FIG. 1. An acoustically conductive plate 12 is mounted on isolating blocks 14 in order to acoustically isolate it from the surface upon which it is located. A conventional resonant acoustic transducer 16 is acoustically coupled to the plate 12 for the purpose of detecting stress wave activity associated with the plate 12. Such stress wave activity is produced by the generation of a piece of handwriting on a surface of the plate 12 using a writing instrument 13. A piece of paper or other similarly surfaced material may be present on the plate 12 to receive the handwriting piece or alternatively the handwriting piece may be written directly on the plate 12. The writing instrument may be a pen or a pencil but other writing instruments may be used. The plate 12 may be steel. The essential requirement for the writing instrument and writing surface is that when the handwriting piece is generated, the friction between them should be sufficient to produce detectable stress waves within the plate 12, and that the plate is acoustically conductive.

The transducer 16 detects the stress wave activity within the plate 12 over a narrow band of frequencies around the resonant frequency of the transducer. The transducer 16 is selected to have a resonant frequency which is well above audio frequencies so that substantially only stress wave activity produced by the interaction of the writing instrument 13 and a writing surface on the plate 12 is detected by the transducer 16.

The transducer 16 converts the detected stress wave activity into an electrical signal. This electrical signal is supplied in series to an amplifier 18, which amplifies the electrical signal and to a root mean square converter 20, which demodulates the electrical signal to an envelope of the stress wave activity associated with the generation of the handwriting piece. The bandwidth, dynamic range and duration of this envelope are suitably limited to those values which are relevant to and characteristic of the particular handwriting piece under investigation.

The output of the root mean square converter 20 is fed to an analog to digital converter 22 which produces a digitized time record of the stress wave activity produced by the generation of the handwriting piece. The digitized time record of the stress activity is supplied to a processing unit 24.

If the author of the handwriting piece has not previously used the device, the digitized time record of the stress wave activity produced during the generation of the authentic handwriting piece is supplied to a store 26. The stored digitized time record of the stress wave activity produced during the authentic handwriting can then be used to determine whether a subsequent generation of the same piece of handwriting is also authentic or a forgery, i.e. whether the samples have a common author.

A subsequent piece of handwriting is generated on the same surface of the plate 12 using the same writing instrument 13. The stress wave activity produced by the subsequent handwriting piece is amplified by the amplifier 18, is processed by the root mean square converter 20 and is then digitized by the analog to digital converter 22. The analog to digital converter 22 outputs the digitized time record of the stress wave activity produced during the subsequent handwriting piece to the processing unit 24, and the processing unit 24 receives the stored digitized time record of the stress wave activity produced by the authentic handwriting piece from the store 26. The processing unit 24 compares the authentic handwriting piece and the subsequent handwriting piece and gives an indication of the degree of conformity between them.

The comparison procedure involves using a dynamic time warping algorithm which takes a portion of the digitized time record of the stress wave activity of the authentic handwriting piece and compares it with the digitized time record of the stress wave activity of the subsequent handwriting piece. The subsequent handwriting piece is displaced in time relative to the authentic handwriting piece through different time periods, to obtain many better matches, and the best match is selected i.e. the match with least errors. Subsequent portions of the subsequent handwriting piece are then compared with the authentic handwriting piece in a similar fashion to obtain the best matches.

The comparison of a portion of the authentic handwriting piece and the best match of the subsequent handwriting piece involves taking a measurement of the difference in amplitude of the stress wave activities and squaring the difference, and taking a measure of the time displacement to obtain the best match. This is a running least squares method which gives an indication of the errors between the two handwriting pieces, and also gives additional time distortion errors between the two handwriting pieces. The total error for the best match for each portion of the authentic handwriting piece is the sum of the square of the amplitude error and the time distortion error. The total error for the best match of all the portions of the authentic handwriting piece is the sum of all the squares of the amplitude errors and all the time distortion errors. If the total error is less than a predetermined value the subsequent handwriting piece has a good degree of conformity with the authentic piece and the processing unit 24 sends a signal to a display unit 28 to indicate the handwriting piece is authentic. If the total error is equal to or greater than the predetermined value, the subsequent handwriting piece is not in conformity with the authentic piece and the processing unit 24 sends a signal to the display unit 28 to indicate that the handwriting piece is a forgery. This procedure allows to some extent, for short term variation in genuine signatures.

A more detailed discussion of time warping of waveforms to aid recognition of similar characteristics in two waveforms, one of which is a stored waveform, may be found in IEEE Transactions on Acoustics, Speech and Signal Processing, Volume ASSP-26 No. 1, February 1978 a report by Hiroaki Sakoe and Seibi Chiba, entitled Dynamic Programming Algorithm Optimization for Spoken Word Recognition.

The processing unit 24 stores the values of time displacement required to distort the subsequent handwriting piece to a best match position with the authentic handwriting piece for each portion of the authentic handwriting piece. The time displacement values are stored in a back pointer array.

Figure 2:
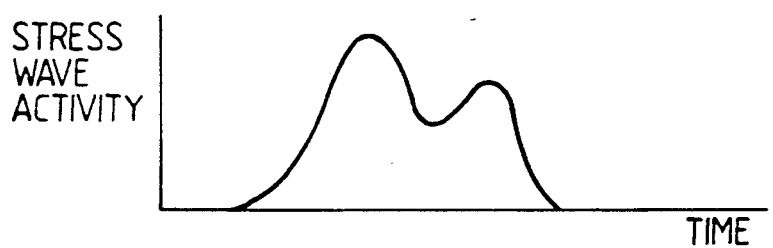
FIG. 2 is a representation of a graph of a detected enveloped stress wave activity versus time during the generation of a piece of handwriting to be verified.
Figure 3:
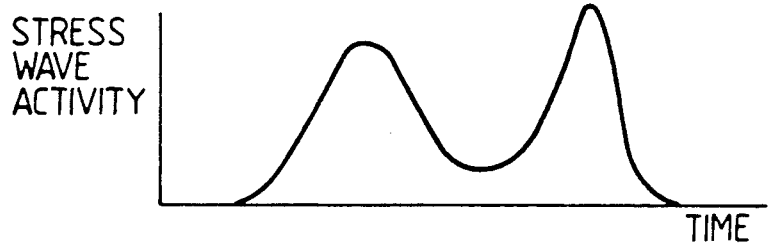
FIG. 3 is a representation of a graph of a stored enveloped stress wave activity versus time during the generation of a piece of handwriting.
Figure 4:
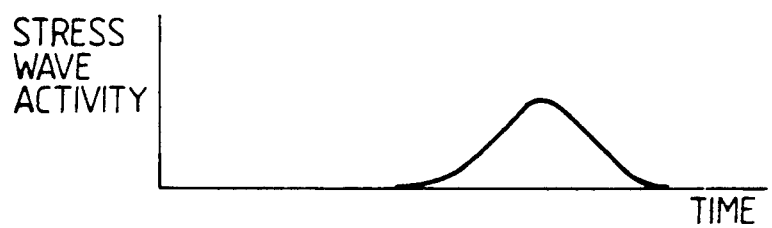
FIG. 4 is a graph showing time displacement values required to obtain a best match of the handwriting pieces in FIGS. 2 and 3.
Figure 5:
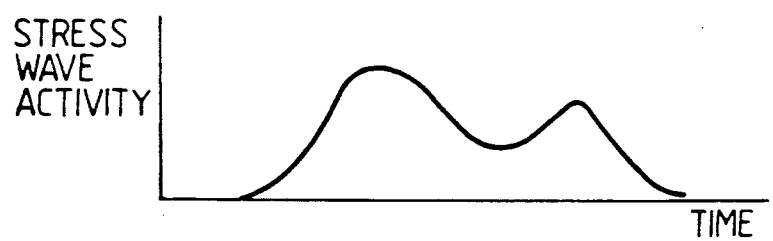
FIG. 5 is a graph of the detected enveloped stress wave activity versus time of FIG. 2 which has been distorted in time by the values in FIG. 4.

As an example the detected enveloped stress wave activity from a piece of handwriting to be verified is shown in FIG. 2, and the stored enveloped stress wave activity from an authentic piece of handwriting is shown in FIG. 3. The time displacement values required to distort the detected enveloped stress wave activity from the piece of handwriting to be verified to give the best match with the stored enveloped stress wave activity from the authentic piece of handwriting are shown in FIG. 4, and the resulting time distorted detected enveloped stress wave activity is shown in FIG. 5.

A problem with this procedure is that the general characteristics of an individual's signature vary over longer periods of time resulting in total errors between the two handwriting pieces which indicate the signature is not authentic.

In order to overcome this problem, if the total error between the two handwriting pieces is less than the predetermined value, the stored digitized time record of the stress wave activity produced by the authentic handwriting piece is replaced by a weighted average of the stored digitized time record of the stress wave activity and the detected digitized time record of the stress wave activity produced during the subsequent generation of the piece of handwriting. The weighted average of the two digitized time records is arranged so a not to give too much emphasis on the last generation of the piece of handwriting. The weighted average of the two digitized time records includes a weighted average of the amplitudes and a weighted average of times of events.

In order to produce the weighted average of the stored digitized time record of the stress wave activity and the detected digitized time record of the stress wave activity produced during the subsequent generation of the piece of handwriting, the time displacement values stored in the backpointer array are again used to distort the detected digitized time record of the stress wave activity to the best fit time scale with the stored digitized time record of the stress wave activity.

Figure 6:
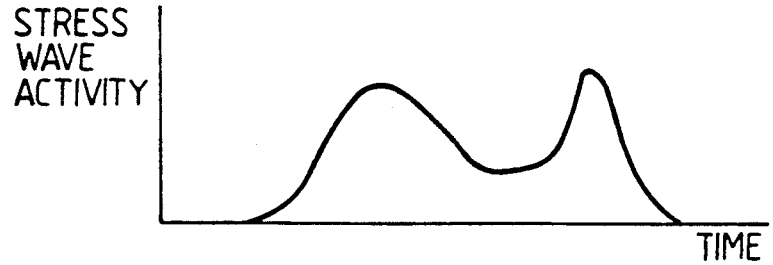
FIG. 6 is a graph of weighted average amplitude of the stored enveloped stress wave activity and the time distorted detected enveloped stress wave activity.

The weighted mean of each point on the stored digitized time record of the stress wave activity and the time warped detected digitized time record of the stress wave activity from the subsequent generation of the piece of handwriting are then calculated to give a weighted averaged amplitude of the two digitized time records, and FIG. 6 shows an example of the weighted average stress wave amplitude of the stored enveloped stress wave activity and the time distorted detected enveloped stress wave activity.

Figure 7:
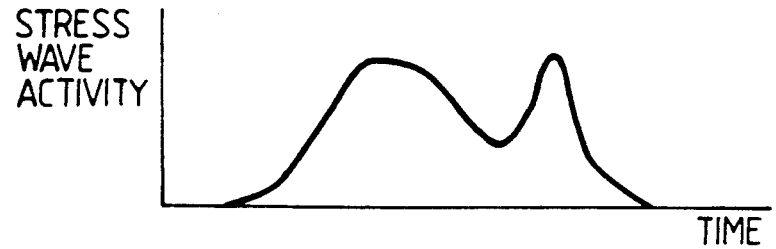
FIG. 7 is a graph of weighted average time and amplitude of the stored enveloped stress wave activity and the detected enveloped stress wave activity.

The weighted mean of times of events is produced by displacing each new stress wave amplitude value in time towards that of the digitized time record of the stress wave activity for the subsequent handwriting piece, the time displacement is weighted by the same value as that used for the weighted average of the stress wave amplitudes, and FIG. 7 shows an example of the weighted average stress wave amplitude and time of the stored stress wave activity and the detected enveloped stress wave activity. This new digitized time record is stored in the store and replaces the original stored digitized time record of the stress wave activity of an authentic record.

It can be seen that the stored digitized time record of the stress wave activity produced during the generation of authentic handwriting pieces is an average of all previously verified handwriting pieces. Thus the continued updating of the stored digitized time record of the stress wave activity produced during the generation of authentic handwriting pieces accommodates longer term variations in the general characteristics of an individuals signature.

A further problem with this procedure is that there are short term variations between an individuals signature which may result in the total error between the two handwriting pieces, being equal to or greater than the predetermined value indicating that the signature is not authentic.

This problem in recognizing authentic handwriting pieces is due to the fact that in some instances an individual has a high variability in the time between groups of writing strokes. This is caused by varying pauses between individual letters or words. These variations in time between groups of pen strokes increase the time distortion necessary to obtain a match between the subsequent handwriting piece and the stored handwriting piece increasing the possibility of the total error exceeding the predetermined value.

During a pause, either with the writing instrument on or off the surface of the body, a low, or zero, level of stress wave activity is generated. The condition of a pause can therefore be easily detected from this low or zero stress wave activity. The error for time distortion during these periods is reduced to allow more variability without producing a high total error for the comparison.

Although least squares has been disclosed, other suitable methods of measuring the errors between the stored stress wave activity and the detected stress wave activity may be used. It may be suitable in some circumstances to compare different measures of the stress wave activity as well as the amplitudes.

Although the description has referred to the transducer being acoustically coupled to the plate, and the transducer detecting stress waves in the plate it may be suitable in appropriate circumstances to acoustically couple the transducer to the writing instrument and detect stress waves in the writing instrument. It may be possible to have the transducer acoustically coupled to another body which is acoustically coupled to the plate or writing instrument.

The stored and detected stress wave activities may be generated by the handwriting piece on different writing surfaces and writing instruments.

Although the description has referred to the verifying of personal handwriting by detecting the stress wave activity in a body or writing instrument produced by the motion of the writing instrument on a surface of the body, it may be equally possible to verify personal handwriting by detecting other time varying characteristics produced by the motion of the writing instrument on the surface of the body. One example is the use of a load cell to detect the force, load or pressure applied on the writing instrument or body during the motion of the writing instrument on the body, e.g. using a strain gauge which is part of an electrical circuit. A further example is the use of a capacitor to detect the capacitance defined between the writing instrument and the surface of the body. Other suitable characteristics which vary with time may be used. All these examples produce a time record of the variation of the particular characteristic. These detected time records may also be compared with stored time records to confirm if they have been produced by a common author. The stored time record is then replaced with a time record which is a weighted average of the stored time record and the detected time record.

The invention directly compares a detected time varying characteristic produced during the motion of a writing instrument on a surface with a stored time varying characteristic of a previous motion of the writing instrument on the surface on a point by point, or portion by portion, basis.

I claim:

1. A device for verifying personal handwriting including a first body on which a piece of handwriting is written using a first writing instrument, said device comprising:
    means for detecting a time varying characteristic produced by the motion of said writing instrument on a surface of said body during the generation of said piece of handwriting,
    storage means for storing a time varying characteristic produced by the motion of a second writing instrument similar to said first writing instrument on a surface of a second body similar to said first body during the generation of at least one previous like piece of handwriting,
    means for comparing the detected time varying characteristic with the stored time varying characteristic to provide an indication of whether the generation of said handwriting pieces produce substantially common time varying characteristics and thus whether the handwriting pieces have been generated by a common author, the means for comparing the detected time varying characteristic with the stored time varying characteristic being arranged to compare each point of the detected time varying characteristic with a corresponding point of the stored time varying characteristic,
    means for producing a weighted average of the stored time varying characteristic and the detected time varying characteristic produced during the generation of a piece of handwriting by a common author, the producing means producing a weighted average of magnitudes of the stored time varying characteristic and the detected time varying characteristic as well as producing a weighted average of time of events of the stored time varying characteristic and the detected time varying characteristic, and
    means for replacing the stored time varying characteristic with the weighted average of the stored time varying characteristic and the detected time varying characteristic produced during the generation of a piece of handwriting by a common author.

2. A device as claimed in claim 1 in which the means for comparing the detected time varying characteristic with the stored time varying characteristic is arranged to distort each point of said detected time varying characteristic in time to obtain a best match with the stored time varying characteristic and stores each of the values of time distortion required to obtain the best match.

3. A device as claimed in claim 2 in which the means for producing a weighted average of the detected time varying characteristic and the stored time varying characteristic is arranged to distort each point of the detected time varying characteristic in time by the corresponding one of the values stored by the comparing means to obtain the best match with the stored time varying characteristics, and is arranged to produce weighted average magnitudes of said time varying characteristic between the stored time varying characteristic and the time distorted detected time varying characteristic and is arranged to produce a weighted average of time of events by displacing the weighted average magnitudes of said time varying characteristic in time towards the detected time varying characteristic.

4. A device as claimed in claim 2 in which the means for comparing the detected time varying characteristic with the stored time varying characteristic is arranged to detect relatively low or zero magnitudes of the time varying characteristic and is arranged to reduce the errors associated with the stored values of time distortion required to obtain the best match with the stored time varying characteristic.

5. A device as claimed in claim 1 in which the time varying characteristic is capacitance, the means for detecting the time varying characteristic is a capacitor defined between the writing instrument and the surface of the body.

6. A device as claimed in claim 1 in which the time varying characteristic is load, the means for detecting the time varying characteristic is a load cell for detecting load produced by the motion of the writing instrument on the surface of the body.

7. A device as claimed in claim 1 in which the time varying characteristic is stress wave activity, the means for detecting the time varying characteristic is an acoustic emission transducer for detecting the stress wave activity produced by the motion of the writing instrument on the surface of the body.

8. A device as claimed in claim 7 in which the means for detecting the stress wave activity comprises a resonant acoustic emission transducer.

9. A device as claimed in claim 7 comprising a means for processing the detected stress wave activity including an enveloping means.

10. A device for verifying personal handwriting comprising the steps of:

detecting a time varying characteristic produced by the motion of a writing instrument on a surface of a body during the generation of a given piece of handwriting, comparing the detected time varying characteristic with a stored time varying characteristic produced by the motion of a like writing instrument on a like surface of a like body during the generation of at least one previous piece of handwriting to provide an indication of whether the generation of said handwriting pieces produce common time varying characteristics and thus whether the pieces have been generated by a common author, comparing each point of the detected time varying characteristic with a corresponding point of the stored time varying characteristic, producing a weighted average of the stored time varying characteristic and the detected time varying characteristic produced during the generation of said handwriting by a common author, the producing step producing a weighted average of magnitudes of the stored time varying characteristic and the detected time varying characteristic and a weighted average of time of events of the stored time varying characteristic and the detected time varying characteristic, replacing the stored time varying characteristic with the weighted average of the stored time varying characteristic and the detected time varying characteristic produced during the generation of a piece of handwriting by a common author.

11. A method as claimed in claim 10 in which each point of the detected time varying characteristic is distorted in time to obtain a best match with the stored time varying characteristic, each of the values of time distortion required to obtain the best match is stored.

12. A method as claimed in claim 11 in which each point of the detected time varying characteristic is distorted in time by the corresponding one of the stored values to obtain the best match with the stored time varying characteristic, producing weighted average magnitudes of said time varying characteristic between the stored time varying characteristic and the time distorted detected time varying characteristic and producing a weighted average of time of events by displacing the weighted average magnitudes of said time varying characteristic in time towards the detected time varying characteristic.

13. A method as claimed in claim 10 in which the time varying characteristic detected is capacitance.

14. A method as claimed in claim 10 in which the time varying characteristic detected is load or pressure.

15. A method as claimed in claim 10 in which the time varying characteristic detected is stress wave activity.

* * * * *